Dec. 11, 1923.
H. C. WALLACE
PNEUMATIC FAN
Filed Sept. 2, 1920
1,477,469
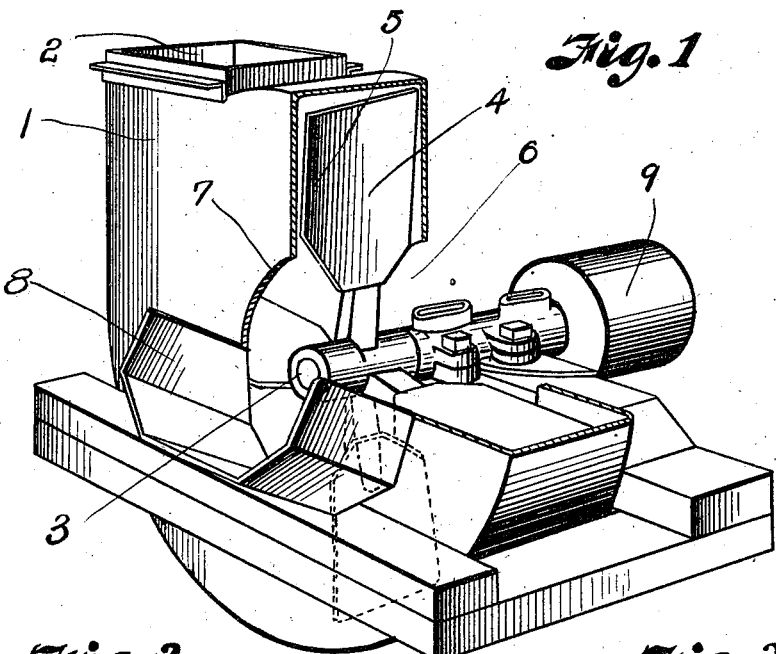
Fig. 1
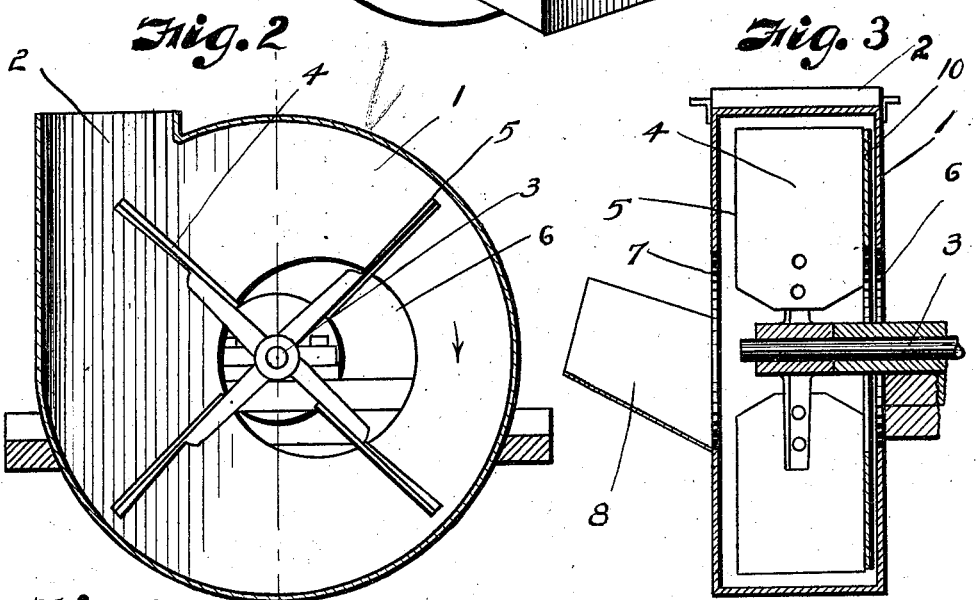
Fig. 2
Fig. 3
Fig. 4
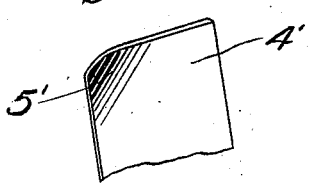
Inventor
Halbert C. Wallace.
By Arthur C. Brown.
Attorney Patented Dec. 11, 1923.

1,477,469

UNITED STATES PATENT OFFICE.

HALBERT C. WALLACE, OF KANSAS CITY, MISSOURI, ASSIGNOR OF THREE-FOURTHS TO JESSE I. WALLACE, OF KANSAS CITY, MISSOURI.

PNEUMATIC FAN.

Application filed September 2, 1920. Serial No. 407,670.

*To all whom it may concern:*

Be it known that I, HALBERT C. WALLACE, a citizen of the United States, residing at Kansas City, in the county of Jackson and State of Missouri, have invented certain new and useful Improvements in Pneumatic Fans; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to pneumatic elevators and particularly to a fan for elevating grain by pneumatic pressure.

Fans have long been used for the purpose of elevating grain but there is a serious objection to known types of fans in that there is liability of grain gravitating to the bottom of the fan case with attendant disadvantages.

I have provided a novel construction of fan by means of which the grain may be passed through the fan case without liability of gravitating or precipitating to the bottom of the fan case, the construction being such that the grain will be picked up by the fan blades and the incoming air in such a manner that the velocity of the grain will be increased as soon as it enters the fan case to a speed sufficient to overcome the gravity thereof.

My invention contemplates a construction in which a fan casing is provided having an air inlet on one side and a grain inlet on the other, the two inlets being concentric one with the other but eccentric with respect to the fan shaft or air impeller in the casing. I also prefer to slightly tip the blades of the air impeller so as to cause the grain to tend to slide across the air impeller from the grain side to the air side where it will receive its greatest velocity before being ejected from the fan case. The novel construction of the invention will be apparent by reference to the accompanying drawings, in which—

Fig. 1 is a view partly in perspective and partly in section of a fan constructed in accordance with my invention.

Fig. 2 is a sectional view through the fan case.

Fig. 3 is a sectional view of a slightly modified form of fan construction, and

Fig. 4 is a fragmentary, perspective view of the tip end of one of the blades.

The fan casing is of the snail shell type and it is illustrated as consisting of a chamber or casing 1 having a tangential outlet 2, to which the conveyor tubes may be attached so that the grain may be elevated to the desired height. Within the casing 1 is a shaft 3, concentric with the casing, and said shaft carries a plurality of radial blades 4, consisting of flat plates slightly inclined so that the edges 5 nearest the grain inlet are slightly advanced in the direction of rotation of the fan blades. The air inlet 6 in one wall is concentric with the grain inlet 7 in the opposite wall, the inlets 6 and 7, however, being eccentric with respect to the shaft. There is a chute or hopper 8 provided for the grain whereby the grain may enter the fan casing 1 opposite the air inlet 6. The shaft 3 is provided with a pulley 9 about which a belt may be placed to drive the fan impeller consisting of the shaft 3 and the blades 4.

Since the openings 6 and 7 are eccentric to the axis of the air impeller with the major portions of the inlets slightly off center, the air entering the fan will be subjected to a rapid velocity increase, because it will be subjected to an appreciable portion of the fan blade surface as soon as it enters the casing and as it slides toward the ends of the fan blades, it will be subjected to the peripheral speed thereof whereby there will be a rapid acceleration of velocity of the air about the impeller. The incoming grain will likewise be subjected to an increased acceleration of velocity.

If the blades are tipped or inclined so that their forward edge portions will be adjacent to the grain inlet side, there will be a tendency for the grain to slide over the blades and thereby get full effect of the velocity of the stream lines of air entering the casing 1 so that the full efficiency of the fan may be obtained.

It may be desirable where the fan blades are inclined to provide a baffle to prevent the grain from striking against the air inlet wall of the fan casing. In Fig. 3 I have shown such a baffle as consisting of a ring 10, fast to the side edges of the fan blades so as to guard the wall in which the air inlet is provided. The baffle 10 simply consists of an annulus or ring fastened in any well known manner to the edges of the blades as shown. In other respects, the construction of Fig. 3 is approximately the same as shown in Figs. 1 and 2.

What I claim and desire to secure by Letters-Patent is:

1. A fan comprising a casing having aligning, concentric inlets on opposite sides thereof, and an air impeller eccentric to the inlet openings, the blades of the impeller being slightly inclined transversely of the casing.

2. A fan comprising a casing having aligning, concentric inlets on opposite sides thereof, an air impeller eccentric to the inlet openings, the blades of the impeller being slightly inclined transversely of the casing, and a guard wall connected to the side edges of the blades of the impeller.

3. A fan comprising a casing having aligning, concentric openings in its opposite end walls eccentric to the casing, and a concentric impeller within the casing having radial blades inclined transversely of the casing.

4. A fan comprising a casing having aligning, concentric openings in its opposite end walls eccentric to the casing, a concentric impeller within the casing having radial blades inclined transversely of the casing, and a ring-shaped guard connected to the forwardly tilted edges of the blades.

In testimony whereof I affix my signature.

HALBERT C. WALLACE.